US012793958B2

(12) United States Patent
Mori et al.

(10) Patent No.: US 12,793,958 B2
(45) Date of Patent: Nov. 10, 2026

(54) MANUFACTURING DEVICE FOR MANUFACTURING SECONDARY CELL ELECTRODE COMPOSITE SLURRY

(71) Applicant: HONDA MOTOR CO., LTD., Tokyo (JP)

(72) Inventors: Keiko Mori, Saitama (JP); Yasuro Katsuyama, Saitama (JP); Masaki Kunigami, Saitama (JP); Shohei Yoshida, Saitama (JP); Satoshi Yonezawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 801 days.

(21) Appl. No.: 18/173,077

(22) Filed: Feb. 23, 2023

(65) Prior Publication Data

US 2023/0290924 A1 Sep. 14, 2023

(30) Foreign Application Priority Data

Mar. 14, 2022 (JP) ................................ 2022-039264

(51) Int. Cl.
*H01M 4/04* (2006.01)
*B01F 23/50* (2022.01)
(Continued)

(52) U.S. Cl.
CPC ........... *H01M 4/043* (2013.01); *B01F 23/581* (2022.01); *B01F 27/50* (2022.01); *B01F 35/2136* (2022.01)

(58) Field of Classification Search
CPC ...... B01F 23/39; B01F 23/581; B01F 23/808; B01F 27/50; B01F 33/821; B01F 35/2136; H01M 4/04; H01M 4/043
(Continued)

(56) References Cited

U.S. PATENT DOCUMENTS 9,172,080 B2 * 10/2015 Shimoizumi ............. B05C 5/02
10,265,645 B2 * 4/2019 Enokihara ................. B29B 7/18
(Continued)

FOREIGN PATENT DOCUMENTS

CN 104718649 A 6/2015
JP 2013244460 A 12/2013
(Continued)

OTHER PUBLICATIONS

Notification of Reasons for Refusal issued Sep. 30, 2025 in the JP Patent Application No. 2022-039264.
(Continued)

*Primary Examiner* — Minh N Trinh
(74) *Attorney, Agent, or Firm* — CKC & Partners Co., LLC

(57) ABSTRACT

An object is to provide a manufacturing device for continuously manufacturing a secondary cell electrode composite slurry, the manufacturing device comprising: a dispersion kneader that continuously disperses and kneads a material of the electrode composite slurry; a first property measurer that measures a property of the electrode composite slurry which has been dispersed and kneaded; a redispersion kneader that redisperses and kneads the electrode composite slurry; and a controller that determines whether or not a redispersing-kneading step is performed based on a result of the measurement performed by the first property measurer.

6 Claims, 3 Drawing Sheets

(51) Int. Cl.
*B01F 27/50* (2022.01)
*B01F 35/21* (2022.01)

(58) Field of Classification Search
USPC .............................................. 29/623; 429/209
See application file for complete search history.

(56) References Cited

U.S. PATENT DOCUMENTS

| | | | | |
|---|---|---|---|---|
| 2012/0291704 | A1* | 11/2012 | Nozaki | B01D 19/0057 118/712 |
| 2014/0010037 | A1* | 1/2014 | Kitayoshi | H01M 4/04 366/75 |
| 2015/0311533 | A1 | 10/2015 | Tachibana et al. | |
| 2021/0155500 | A1* | 5/2021 | Takakuwa | C01G 51/42 |

FOREIGN PATENT DOCUMENTS

| | | | |
|---|---|---|---|
| JP | 2014107191 | A | 6/2014 |
| JP | 2015222651 | A | 12/2015 |
| JP | 2018067433 | A | 4/2018 |
| JP | 2021111560 | A | 8/2021 |
| KR | 101856483 | B1 | 5/2018 |
| WO | 2014042266 | A1 | 3/2014 |

OTHER PUBLICATIONS

Notification of Reasons for Refusal issued Mar. 3, 2026 in the JP Patent Application No. 2022-039264.
Office Action issued May 1, 2026 in the CN Patent Application No. 202310155556.7.

* cited by examiner

MANUFACTURING DEVICE FOR MANUFACTURING SECONDARY CELL ELECTRODE COMPOSITE SLURRY

This application is based on and claims the benefit of priority from Japanese Patent Application No. 2022-039264, filed on 14 Mar. 2022, the content of which is incorporated herein by reference.

BACKGROUND OF THE INVENTION

Field of the Invention

The present invention relates to a method for manufacturing a secondary cell electrode composite slurry and a manufacturing device.

Related Art

In recent years, in terms of climate-related disasters, in order to reduce $CO_2$, attention has been focused on secondary cells such as a lithium ion secondary cell which are used in various applications such as an in-vehicle application.

As a method for manufacturing an electrode in a secondary cell such as a lithium ion secondary cell, a method is conventionally known in which an electrode composite slurry manufactured by dispersing, in a solvent, materials such as an electrode active material and a binder is applied to an electrode current collector. As a method for manufacturing an electrode composite slurry, for example, a batch-type manufacturing method is known in which a device such as an ultrasonic dispersion device is used to sequentially produce a predetermined amount of electrode composite (see, for example, Japanese Unexamined Patent Application, Publication No. 2021-111560).

Patent Document 1: Japanese Unexamined Patent Application, Publication No. 2021-111560

SUMMARY OF THE INVENTION

In a method for manufacturing a slurry for all solid-state cell construction which is disclosed in Japanese Unexamined Patent Application, Publication No. 2021-111560, a step of measuring the viscosity of a composition is provided, and thus when the viscosity falls outside a predetermined appropriate application range, it is possible to adjust the viscosity. On the other hand, since a technique disclosed in Japanese Unexamined Patent Application, Publication No. 2021-111560 is the batch-type manufacturing method, it is impossible to continuously manufacture the slurry. Although as the method for manufacturing an electrode composite slurry, it can be considered to use a continuous kneader to continuously manufacture the slurry, it is difficult to adjust the viscosity of the slurry in a continuous manufacturing method, with the result that a large number of faulty products with the viscosity of the slurry outside an appropriate range may be produced.

The present invention is made in view of the foregoing, and an object of the present invention is to provide a method for manufacturing an electrode composite slurry and a manufacturing device which can continuously manufacture an electrode composite slurry and suppress the production of faulty products.

(1) The present invention relates to a method for continuously manufacturing a secondary cell electrode composite slurry, and the method includes: a dispersing-kneading step of continuously dispersing and kneading the material of the electrode composite slurry; a first property measurement step of measuring the property of the electrode composite slurry that has been dispersed and kneaded; a redispersing-kneading step of redispersing and kneading the electrode composite slurry; and a property determination step of determining whether or not the redispersing-kneading step is performed based on the result of the measurement in the first property measurement step.

According to the invention of (1), it is possible to provide the method for manufacturing an electrode composite slurry which can continuously manufacture the electrode composite slurry and suppress the production of faulty products.

(2) The method for manufacturing a secondary cell electrode composite slurry described in (1), where the first property measurement step includes measuring at least the impedance of the electrode composite slurry.

According to the invention of (2), when the electrode composite slurry is not fully dispersed, the electrode composite slurry can be redispersed and kneaded, with the result that it is possible to suppress the production of faulty products.

(3) The method for manufacturing a secondary cell electrode composite slurry described in (1), where the first property measurement step includes measuring the impedance and the viscosity of the electrode composite slurry.

According to the invention of (3), when the electrode composite slurry is not fully dispersed or when the viscosity is not suitable for application, the electrode composite slurry can be redispersed and kneaded, with the result that it is possible to suppress the production of faulty products.

(4) The method for manufacturing a secondary cell electrode composite slurry described in any one of (1) to (3), further including: a magnetic separation step of removing a magnetic metal by performing magnetic separation on the electrode composite slurry that has been dispersed and kneaded in the dispersing-kneading step, where the first property measurement step includes measuring the property of the electrode composite slurry on which the magnetic separation has been performed in the magnetic separation step.

According to the invention of (4), in the property measurement step, whether or not the electrode composite slurry is redispersed and kneaded can be determined based on the property of the electrode composite slurry on which the magnetic separation has been performed, and thus a more accurate determination can be made.

(5) The method for manufacturing a secondary cell electrode composite slurry described in any one of (1) to (4), where at least one of a dispersing-kneading torque and the amount of solvent in the dispersing-kneading step is adjusted according to the property of the electrode composite slurry measured in the first property measurement step.

According to the invention of (5), the production of faulty products is immediately fed back, and thus an adjustment is made in the dispersing-kneading step such that faulty products are not produced, with the result that it is possible to further suppress the production of faulty products.

(6) The method for manufacturing a secondary cell electrode composite slurry described in any one of (1) to (5), further including: a second property measurement step of measuring the property of the electrode composite slurry that has been redispersed and kneaded in the redispersing-kneading step.

According to the invention of (6), it is possible to sort finished products from faulty products according to the property of the electrode composite slurry which has been redispersed and kneaded.

(7) The present invention relates to a manufacturing device for continuously manufacturing a secondary cell electrode composite slurry, and the manufacturing device includes: a dispersion kneader that continuously disperses and kneads the material of the electrode composite slurry; a first property measurer that measures the property of the electrode composite slurry which has been dispersed and kneaded; a redispersion kneader that redisperses and kneads the electrode composite slurry; and a controller that determines whether or not a redispersing-kneading step is performed based on the result of the measurement performed by the first property measurer.

According to the invention of (7), it is possible to provide the manufacturing device for manufacturing an electrode composite slurry which can continuously manufacture the electrode composite slurry and suppress the production of faulty products.

(8) The manufacturing device for manufacturing a secondary cell electrode composite slurry described in (7), where the first property measurer measures at least the impedance of the electrode composite slurry.

According to the invention of (8), when the electrode composite slurry is not fully dispersed, the electrode composite slurry can be redispersed and kneaded, with the result that it is possible to suppress the production of faulty products.

(9) The manufacturing device for manufacturing a secondary cell electrode composite slurry described in (7), where the first property measurer measures at least the impedance and the viscosity of the electrode composite slurry.

According to the invention of (9), when the electrode composite slurry is not fully dispersed or when the viscosity is not suitable for application, the electrode composite slurry can be redispersed and kneaded, with the result that it is possible to suppress the production of faulty products.

(10) The manufacturing device for manufacturing a secondary cell electrode composite slurry described in any one of (7) to (9), further including: a magnetic separator that removes a magnetic metal by performing magnetic separation on the electrode composite slurry which has been dispersed and kneaded by the dispersion kneader, where the first property measurer is arranged at a stage subsequent to the magnetic separator.

According to the invention of (10), the controller can determine whether or not the electrode composite slurry is redispersed and kneaded based on the property of the electrode composite slurry on which the magnetic separation has been performed, and thus a more accurate determination can be made.

(11) The manufacturing device for manufacturing a secondary cell electrode composite slurry described in any one of (7) to (10), where the controller adjusts at least one of the torque of the dispersion kneader and the amount of solvent according to the property of the electrode composite slurry measured with the first property measurer.

According to the invention of (11), the production of faulty products is immediately fed back, and thus an adjustment is made in the dispersion kneader such that faulty products are not produced, with the result that it is possible to further suppress the production of faulty products.

(12) The manufacturing device for manufacturing a secondary cell electrode composite slurry described in any one of (7) to (11), further including: a second property measurer that measures the property of the electrode composite slurry which has been redispersed and kneaded by the redispersion kneader.

According to the invention of (12), it is possible to sort finished products from faulty products according to the property of the electrode composite slurry which has been redispersed and kneaded.

(13) The manufacturing device for manufacturing a secondary cell electrode composite slurry described in any one of (7) to (12), where the redispersion kneader includes: a tube; a turned portion that is arranged inside the tube and is turnable around the central axis of the tube; and a flow path which is provided between the tube and the turned portion and through which the electrode composite slurry can flow.

According to the invention of (13), it is not necessary to perform, for example, control such that the flow path for the slurry is separately caused to branch to switch the flow of the slurry, with the result that the configuration of the manufacturing device for manufacturing a secondary cell electrode composite slurry can be simplified.

DETAILED DESCRIPTION OF THE INVENTION

<Secondary Cell Electrode Composite Slurry>

Figure 1:
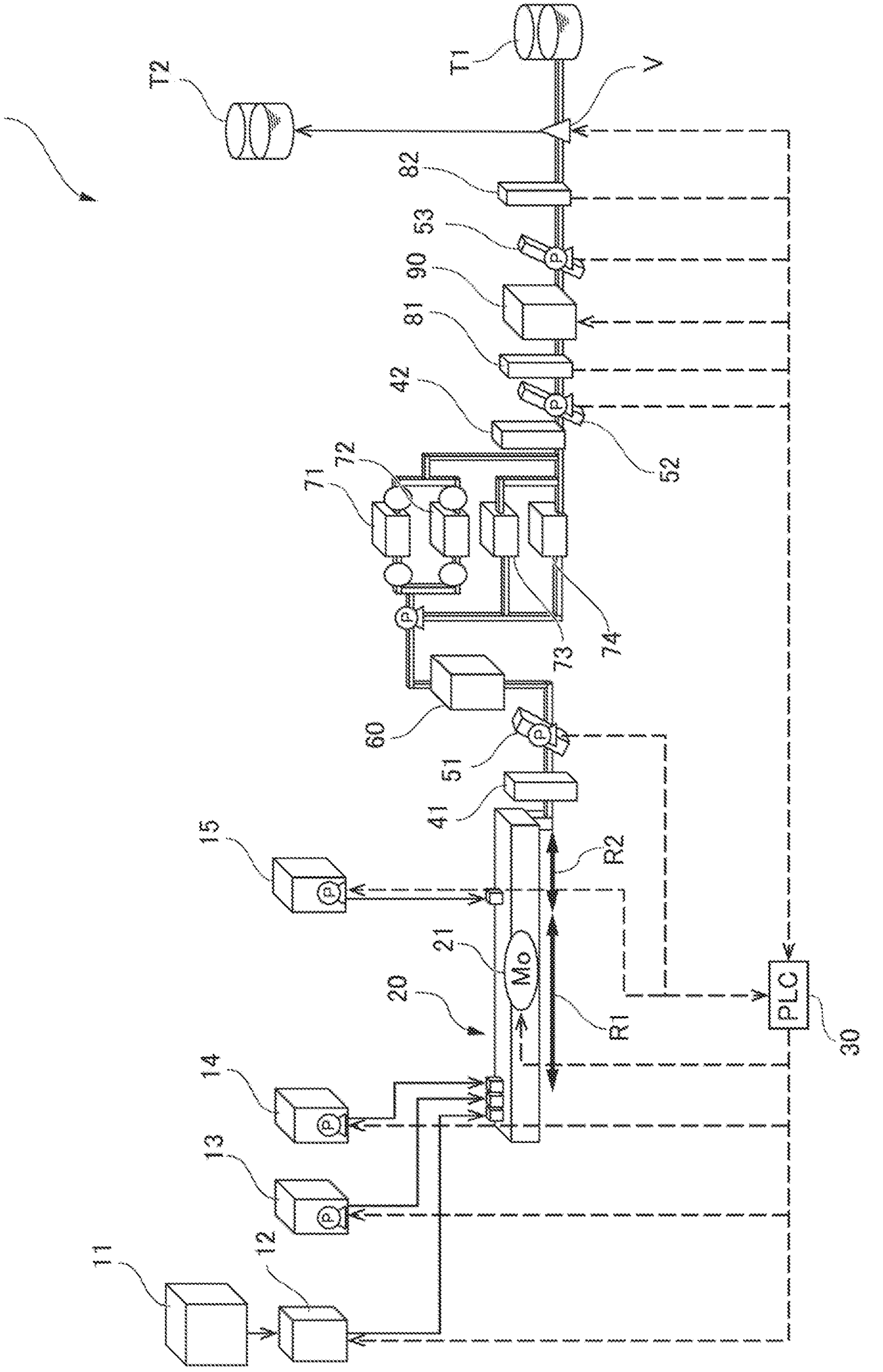
FIG. 1 is a block diagram showing a manufacturing device for manufacturing an electrode composite slurry according to an embodiment of the present invention.

A description will be given below of a secondary cell electrode composite slurry (which may be hereinafter referred to as the "electrode composite slurry" or "slurry") which is manufactured by a method for manufacturing a secondary cell electrode composite slurry and a manufacturing device according to an embodiment of the present invention.

The secondary cell electrode composite slurry is used when a positive electrode or a negative electrode for a secondary cell is manufactured. Although the description will be given below using a lithium ion solid-state secondary cell as an example, the type of secondary cell to which the method for manufacturing a secondary cell electrode composite slurry and the manufacturing device according to the present invention can be applied is not particularly limited.

In the secondary cell electrode composite slurry, an electrode material including, as an essential material, an electrode active material which is one of a negative electrode active material and a positive electrode active material is dispersed in a solvent. As the electrode material, a binder, a conductive aid, a solid electrolyte and the like other than the electrode active material may be included.

Although the negative electrode active material is not particularly limited, examples thereof include: a lithium transition metal oxide such as lithium titanate ($Li_4Ti_5O_{12}$); transition metal oxides such as $TiO_2$, $Nb_2O_3$ and $WO_3$; a metal sulfide; a metal nitride; graphite; carbon materials such as soft carbon and hard carbon; metallic lithium; metallic indium; a lithium alloy; and the like.

Although the positive electrode active material is not particularly limited, examples of the positive electrode active material which can be used include: layered positive electrode active material particles such as $LiCoO_2$, $LiNiO_2$, $LiCo_{1/3}Ni_{1/3}Mn_{1/3}O_2$, $LiVO_2$ and $LiCrO_2$; spinel-type positive electrode active materials such as $LiMn_2O_4$, $Li(Ni_{0.25}Mn_{0.75})_2O_4$, $LiCoMnO_4$ and $Li_2NiMn_3O_8$; olivine-type positive electrode active materials such as $LiCoPO_4$, $LiMnPO_4$ and $LiFePO_4$; and like.

The binder serves as a binding agent or a thickener in an electrode layer, uniformizes the electrode composite slurry and further provides an adequate viscosity. Although the binder is not particularly limited, examples thereof include acrylic acid-based polymers, cellulose-based polymers, styrene-based polymers, vinyl acetate-based polymers, urethane-based polymers, fluoroethylene-based polymers, methacrylic acid ester polymers, acrylic acid ester polymers and the like.

Although the conductive aid is not particularly limited, examples thereof include acetylene black, natural graphite, artificial graphite and the like.

Although the solvent is not particularly limited as long as the solvent has an affinity for the electrode material, examples thereof include aliphatic hydrocarbons, aromatic hydrocarbons, esters, ethers, ketones, nitriles and the like.

The secondary cell electrode composite slurry is applied to the surface of an electrode current collector by a known application method. Here, it is necessary to adjust the viscosity of the secondary cell electrode composite slurry such that the viscosity is suitable for the application and to uniformly disperse the electrode material in the solvent. The secondary cell electrode composite slurry applied to the surface of the electrode current collector is dried, thus the solvent volatilizes and the electrode layer is formed on the electrode current collector, with the result that a secondary cell electrode is manufactured.

<Manufacturing Device for Manufacturing Secondary Cell Electrode Composite Slurry>

The configuration of a manufacturing device 100 for manufacturing a secondary cell electrode composite slurry according to the present embodiment will be described below with reference to FIG. 2.

The manufacturing device 100 for manufacturing a secondary cell electrode composite slurry according to the present embodiment includes, as a material supply source for the secondary cell electrode composite slurry, an electrode material storage unit 11, a feeder 12, a solvent storage supply unit 13, a binder liquid storage supply unit 14 and a solvent storage supply unit 15. A predetermined amount of material is supplied to a dispersion kneader 20 from the material supply source described above.

Although the dispersion kneader 20 is not particularly limited as long as the dispersion kneader 20 is a continuous kneader, for example, a kneader such as a continuous uniaxial kneader or a continuous biaxial kneader can be used. The kneader uses a shear force produced between kneading shafts (blades) or a kneading shaft and a kneading chamber which are driven by a motor 21, and thereby kneads and disperses the material. The dispersion kneader 20 includes a stiff kneading region R1 and a dilution region R2. In the stiff kneading region R1, the electrode material is subjected to stiff kneading with a predetermined torque for a predetermined time, and the solvent is thereafter supplied from the solvent storage supply unit 15 in the dilution region R2 and is stirred with the kneaded material obtained in the stiff kneading region R1. Since the dispersion kneader 20 includes the stiff kneading region R1 and the dilution region R2 described above, the dispersibility of the electrode material in the solvent is enhanced, and the viscosity of the secondary cell electrode composite slurry can easily be adjusted.

As indicated by broken lines in FIG. 1, a controller 30 is formed to be able to communicate with the units of the manufacturing device 100 for manufacturing a secondary cell electrode composite slurry. Although the controller 30 is not particularly limited, for example, the controller 30 is a PLC (Programmable Logic Controller) which includes an input unit, an output unit, a storage unit, a CPU, a power supply and the like. Specific control performed by the controller 30 will be described in detail later.

The slurry kneaded by the dispersion kneader 20 is deaerated and stirred with a stirrer 41, the viscosity of the slurry is measured with a viscosity measuring device 51, the slurry is thereafter passed through a magnetic separator 60 and filters 71 to 74 and thus foreign substances are removed.

The viscosity measuring device 51 is not particularly limited, and the same viscosity measuring device as viscosity measuring devices 52 and 53 which will be described later can be used.

The magnetic separator 60 is a device which removes, by magnetic force, magnetic metal foreign substances such as iron, nickel and chromium from the slurry kneaded by the dispersion kneader 20. The magnetic separator 60 is not particularly limited, and a known magnetic separator can be used.

The filters 71 to 74 are devices which remove foreign substances from the material kneaded by the dispersion kneader 20. The filters 71 to 74 are not particularly limited, and a cartridge filter, a magnetic filter and the like can be used.

The slurry passed through the magnetic separator 60 and the filters 71 to 74 is deaerated and stirred with a stirrer 42, and the properties of the slurry are measured with the viscosity measuring device 52 and an impedance measuring device 81 serving as a first property measurer arranged at a stage subsequent to the magnetic separator 60. Although in the present embodiment, the configuration of the manufacturing device 100 for manufacturing a secondary cell electrode composite slurry which includes the viscosity measuring device 52 and the impedance measuring device 81 serving as the first property measurer is described, the first property measurer preferably includes at least the impedance measuring device 81, and more preferably includes both the viscosity measuring device 52 and the impedance measuring device 81.

The viscosity measuring device 52 is not particularly limited, and for example, a vibration viscometer can be used.

The impedance measuring device 81 is a device which measures a current or a voltage produced by the application of an alternating current or an alternating-current voltage to the slurry. The impedance of the slurry is measured, and thus it is possible to grasp whether or not the material is uniformly dispersed. For example, the impedance measuring device 81 is formed by arranging a measurement terminal in a liquid feed pipe for the slurry.

The properties (the viscosity and the impedance) of the slurry measured with the first property measurer are transmitted to the controller 30. The slurry in which the properties have been measured with the first property measurer is supplied to a redispersion kneader 90. Whether or not redispersing and kneading is performed by the redispersion kneader 90 is determined by the controller 30 according to the properties of the slurry measured with the first property measurer.

For example, when one of the viscosity and the impedance of the slurry measured with the first property measurer falls outside a target viscosity range or a target impedance range for the slurry which is previously set, the controller 30 causes the redispersion kneader 90 to perform the redispersing and kneading. Specifically, when the viscosity of the slurry measured with the first property measurer exceeds the target viscosity range for the slurry or when the impedance of the slurry measured with the first property measurer exceeds the upper limit value of the target impedance range, the redispersing and kneading is performed, and thus it is possible to lower the viscosity and the impedance of the slurry.

The controller 30 preferably adjusts at least one of the torque pressure and the number of revolutions of the motor 21 in the dispersion kneader 20 according to the properties (the viscosity and the impedance) of the slurry measured with the first property measurer. Specifically, when the viscosity or the impedance of the slurry measured with the first property measurer falls outside the preset target range and falls within a predetermined range, an adjustment is preferably made such that the torque pressure of the motor 21 is increased or decreased to cause the viscosity of the slurry to fall within the target viscosity range. When the viscosity or the impedance of the slurry measured with the first property measurer falls outside the preset target range and falls outside the predetermined range described above, an adjustment is preferably made such that the number of revolutions of the motor 21 in the dispersion kneader 20 is adjusted to cause the viscosity of the slurry to fall within the target viscosity range.

Figure 2:
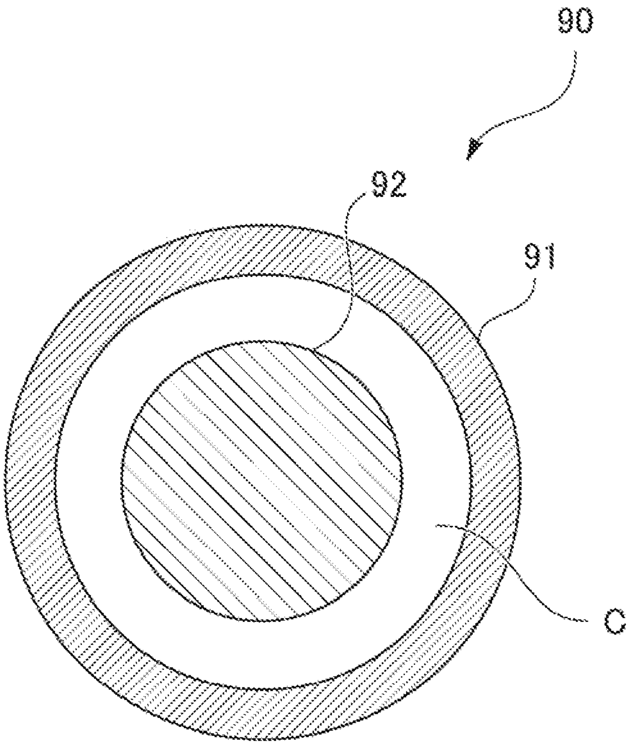
FIG. 2 is a cross-sectional view showing the configuration of a redispersion kneader in the embodiment of the present invention.

Although the redispersion kneader 90 is not particularly limited, the redispersion kneader 90 preferably has a configuration shown in FIG. 2. FIG. 2 is a cross-sectional view when the redispersion kneader 90 is viewed in the direction of a flow path. As shown in FIG. 2, the redispersion kneader 90 includes a tube 91, a turned portion 92 that is arranged inside the tube 91 and is turnable around the central axis of the tube 91 and a flow path C which is formed between the tube 91 and the turned portion 92. The flow path C is a flow path through which the slurry can flow. The slurry is caused to flow through the flow path C and the turned portion 92 is turned, and thus the material can be kneaded and dispersed by a shear force produced between the turned portion 92 and the tube 91.

The redispersion kneader 90 has the configuration described above, and thus control is preferably performed such that when it is determined that the slurry needs to be redispersed and kneaded, the turned portion 92 is turned whereas when it is determined that the slurry does not need to be redispersed and kneaded, the turned portion 92 is not turned. Hence, it is not necessary to perform, for example, control such that the flow path for the slurry is separately caused to branch to switch the flow of the slurry, with the result that the configuration of the manufacturing device 100 for manufacturing a secondary cell electrode composite slurry can be simplified.

The properties of the slurry passed through the redispersion kneader 90 are measured with the viscosity measuring device 53 and an impedance measuring device 82 serving as a second property measurer. As the configurations of the viscosity measuring device 53 and the impedance measuring device 82, the same configurations as the viscosity measuring device 52 and the impedance measuring device 81 can be adopted. A three-way valve V is arranged at a stage subsequent to the second property measurer, and when the result of the property measurement performed by the second property measurer falls within a target property range, the slurry is determined to be non-defective, the three-way valve V is controlled by the controller 30 to open a flow path toward a tank T1 and thus the finished slurry is stored in the tank T1. When the result of the property measurement performed by the second property measurer falls outside the target property range, the slurry is determined to be defective, the three-way valve V is controlled by the controller 30 to open a flow path toward a tank T2 and thus the defective slurry is stored in the tank T2.

<Method for Manufacturing Secondary Cell Electrode Composite Slurry>

Figure 3:
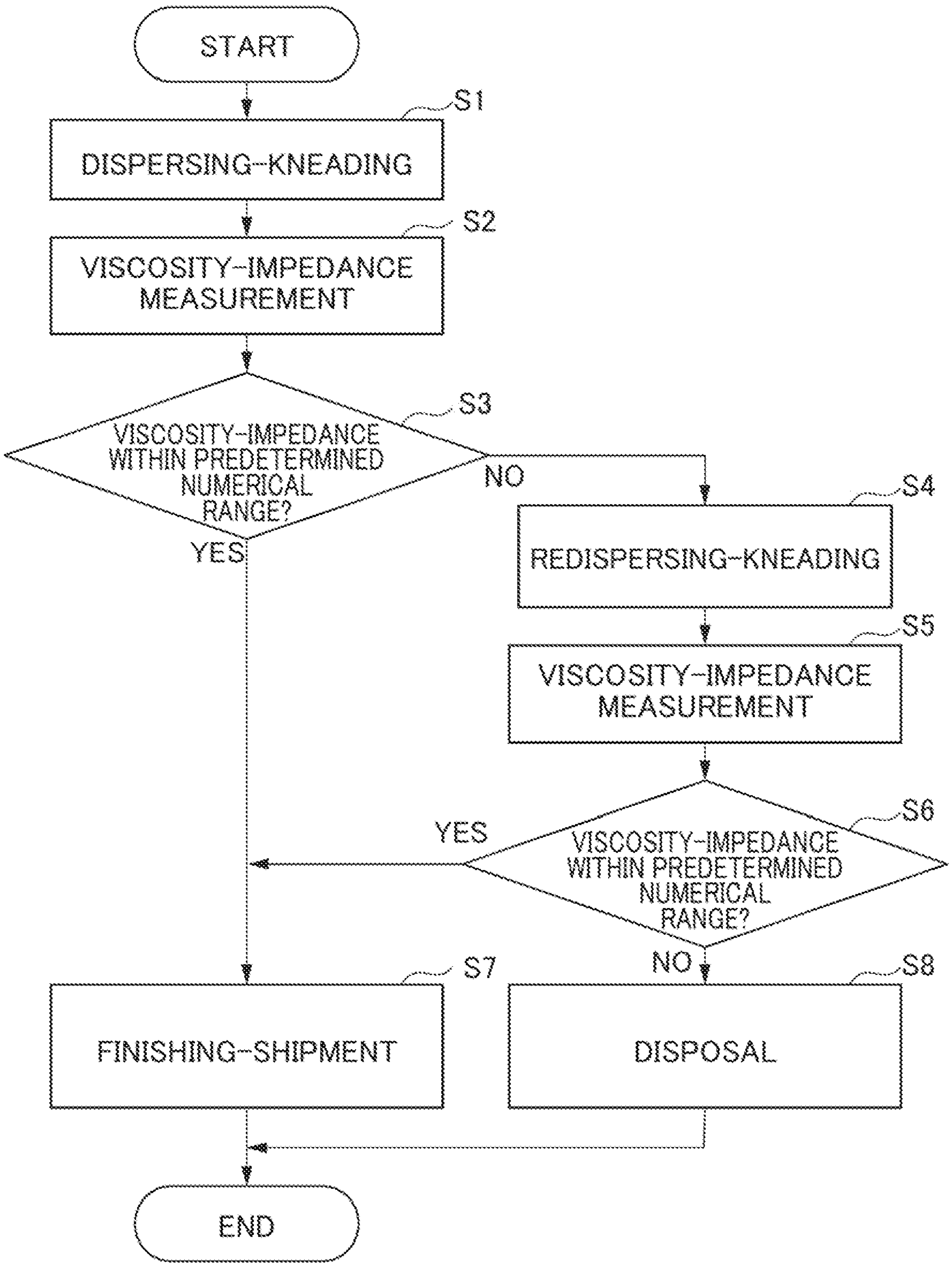
FIG. 3 is a flow diagram showing a method for manufacturing an electrode composite slurry according to the embodiment of the present invention.

The method for manufacturing a secondary cell electrode composite slurry according to the present embodiment will then be described with reference to FIG. 3. As shown in FIG. 3, the method for manufacturing a secondary cell electrode composite slurry according to the present embodiment includes: a dispersing-kneading step S1 of continuously dispersing and kneading the material of the electrode composite slurry; a first property measurement step S2 of measuring the property of the electrode composite slurry that has been dispersed and kneaded; a property determination step S3 of determining whether or not a redispersing-kneading step is performed based on the result of the measurement in the first property measurement step S2; and the redispersing-kneading step S4. The method for manufacturing a secondary cell electrode composite slurry also includes: a second property measurement step S5 of measuring the property of the electrode composite slurry that has been redispersed and kneaded in the redispersing-kneading step S4, and preferably further includes: a second property determination step S6 of performing a finishing-shipment step S7 when the result of the measurement in the second property measurement step S5 falls within a predetermined numerical range and performing a disposal step S8 when the result of the measurement in the second property measurement step falls outside the predetermined numerical range. At least one of a dispersing-kneading torque and the amount of solvent in the dispersing-kneading step S1 is preferably adjusted based on the result of the measurement in the first property measurement step S2.

The dispersing-kneading step S1 is a step of using a device such as the dispersion kneader 20 described above to disperse and knead the electrode material and the solvent. After the dispersing-kneading step S1, the processing proceeds to the first property measurement step S2.

The first property measurement step S2 is a step of measuring at least the impedance of the electrode composite slurry. The first property measurement step S2 is preferably a step of measuring the impedance and the viscosity of the electrode composite slurry. A specific method for measuring the impedance and the viscosity of the electrode composite slurry is as described previously. After the first property measurement step S2, the processing proceeds to the property determination step S3.

The method for manufacturing a secondary cell electrode composite slurry according to the present embodiment may additionally include a magnetic separation step of removing a magnetic metal by performing magnetic separation on the electrode composite slurry that has been dispersed and kneaded in the dispersing-kneading step S1. In this case, the first property measurement step S2 is preferably performed after the magnetic separation step.

The property determination step S3 is a step of determining whether or not the redispersing-kneading step S4 is performed based on the property of the electrode composite slurry measured in the first property measurement step S2. When each of the viscosity and the impedance of the electrode composite slurry measured in the first property measurement step S2 falls within a predetermined numerical range, the processing proceeds to the finishing-shipment step S7. When at least one of the viscosity and the impedance of the electrode composite slurry measured in the first property measurement step S2 falls outside the predetermined numerical range, the processing proceeds to the redispersing-kneading step S4.

A step of adjusting at least one of the dispersing-kneading torque and the amount of solvent in the dispersing-kneading step S1 based on the property of the electrode composite slurry measured in the first property measurement step S2 may be additionally provided. Specifically, when the viscosity or the impedance of the slurry measured in the first property measurement step S2 falls outside a preset target range and falls within a predetermined range, an adjustment is preferably made such that a dispersing-kneading torque pressure is increased or decreased to cause the viscosity of the slurry to fall within the target viscosity range. When the viscosity or the impedance of the slurry measured in the first property measurement step S2 falls outside the preset target range and falls outside the predetermined range, an adjustment is preferably made such that the number of revolutions of the motor in the dispersion kneader is adjusted in the dispersing-kneading step S1 to cause the viscosity of the slurry to fall within the target viscosity range.

The redispersing-kneading step S4 is a step of using a device such as the redispersion kneader 90 described above to redisperse and knead the electrode composite slurry. After the redispersing-kneading step S4, the processing proceeds to the second property measurement step S5.

As with the first property measurement step S2, the second property measurement step S5 is a step of measuring at least the impedance of the electrode composite slurry, and is preferably a step of measuring the impedance and the viscosity of the electrode composite slurry. After the second property measurement step S5, the processing proceeds to the second property determination step S6.

The second property determination step S6 is a step of determining whether the electrode composite slurry is shipped as a finished product or is disposed of as a faulty product based on the property of the electrode composite slurry measured in the second property measurement step S5. When each of the viscosity and the impedance of the electrode composite slurry measured in the second property measurement step S5 falls within the predetermined numerical range, the processing proceeds to the finishing-shipment step S7. When at least one of the viscosity and the impedance of the electrode composite slurry measured in the second property measurement step S5 falls outside the predetermined numerical range, the processing proceeds to the disposal step S8.

The preferred embodiment of the present invention has been described above. The present invention is not limited to the embodiment described above, and can be changed as necessary without departing from the spirit of the present invention.

EXPLANATION OF REFERENCE NUMERALS

100 manufacturing device for manufacturing secondary cell electrode composite slurry
20 dispersion kneader
52 viscosity measuring device constituting first property measurer
53 viscosity measuring device constituting second property measurer
60 magnetic separator
81 impedance measuring device constituting first property measurer
82 impedance measuring device constituting second property measurer
90 redispersion kneader
S1 dispersing-kneading step
S2 first property measurement step
S3 property determination step
S4 redispersing-kneading step

What is claimed is:

1. A manufacturing device for continuously manufacturing a secondary cell electrode composite slurry, the manufacturing device comprising:

a dispersion kneader that continuously disperses and kneads a material of the electrode composite slurry;

a first property measurer that measures a property of the electrode composite slurry which has been dispersed and kneaded;

a redispersion kneader that redisperses and kneads the electrode composite slurry; and a controller that determines whether or not a redispersing-kneading step is performed based on a result of the measurement performed by the first property measurer, wherein the dispersion kneader, the first property measurer, and the redispersion kneader are connected in this order via one flow path, the controller is connected to the first property measurer and the redispersion kneader in a communicable manner, the redispersion kneader includes a tube;

a turned portion that is arranged inside the tube and is turnable around a central axis of the tube; and an other flow path which is provided between the tube and the turned portion and through which the electrode composite slurry can flow, and the redispersion kneader redisperses and kneads the electrode composite slurry by a shear force produced between the turned portion and the tube while allowing the electrode composite slurry to flow through the other flow path.

2. The manufacturing device for manufacturing a secondary cell electrode composite slurry according to claim 1, wherein the first property measurer includes an impedance measuring device that measures an impedance of the electrode composite slurry.

3. The manufacturing device for manufacturing a secondary cell electrode composite slurry according to claim 1, wherein the first property measurer includes an impedance measuring device that measures an impedance of the electrode composite slurry and a viscosity measuring device that measures a viscosity of the electrode composite slurry.

4. The manufacturing device for manufacturing a secondary cell electrode composite slurry according to claim 1, further comprising: a magnetic separator that removes a magnetic metal by performing magnetic separation on the electrode composite slurry which has been dispersed and kneaded by the dispersion kneader, wherein the first property measurer is arranged at a stage subsequent to the magnetic separator.

5. The manufacturing device for manufacturing a secondary cell electrode composite slurry according to claim 1, wherein the controller adjusts at least one of a torque of the dispersion kneader and an amount of solvent according to the property of the electrode composite slurry measured with the first property measurer.

6. The manufacturing device for manufacturing a secondary cell electrode composite slurry according to claim 1, further comprising: a second property measurer that measures a property of the electrode composite slurry which has been redispersed and kneaded by the redispersion kneader.

* * * * *